(No Model.)

C. E. VAN NORMAN.
SHOE LACING HOOK.

No. 565,099. Patented Aug. 4, 1896.

Witnesses:
Marion Fowler Jr
N. C. Lane

Inventor:
Charles E. Van Norman,
by Edward S. Beach,
Attorney.

UNITED STATES PATENT OFFICE.

CHARLES E. VAN NORMAN, OF SPRINGFIELD, MASSACHUSETTS.

SHOE-LACING HOOK.

SPECIFICATION forming part of Letters Patent No. 565,099, dated August 4, 1896.

Application filed June 24, 1893. Serial No. 478,723. (No model.)

*To all whom it may concern:*

Be it known that I, CHARLES E. VAN NORMAN, a citizen of the United States, and a resident of Springfield, in the county of Hampden and State of Massachusetts, have invented new and useful Improvements in Shoe-Lacing Hooks, of which the following, taken in connection with the accompanying drawings, is a specification.

This invention relates to improvements in the heads of shoe-lacing hooks and of analogous fastening devices of the kind having a metallic body or shell and a molded composition top or head, and it has for its object the ready applying of said molded head to the metallic body, so as to secure and interlock the parts in a firm and substantial manner, as will hereinafter be more fully shown and described, reference being had to the accompanying drawings, where—

Figure 1:
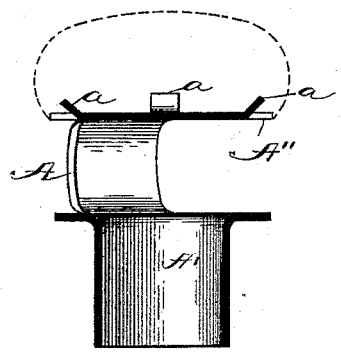
Figure 2:
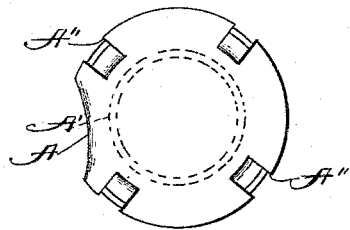

Figure 1 is a central sectional elevation of a lacing-stud the head of which embodies my invention, this view being on line 1 1 of Fig. 2. Fig. 2 is a top plan view of the covered stud shown in Fig. 1.

In the drawings illustrating my invention embodied in a lacing-hook, which is taken as a type of the covered fastening devices commonly used on lace-boots, A represents the hook-body, and A' the usual shank or eyelet.

A" is the top plate or head of the fastening device—hook, eyelet, or button, as the case may be—this head being the part to be covered with plastic material, such as rubber compound, celluloid, and other compositions now well known in the art, the material being molded on the heads to cover the same.

Prior to my invention great difficulty has been met in securing the molded plastic heads permanently and durably in place, because the molded heads, when solidified, tend to shrink away from the metal. Consequently, in practice, the molded heads are found to hold to the metal top plates, not by mere adhesion, as might be supposed, but, on the contrary, chiefly by reason of the mechanical combination of the molded heads and covered plates. In many constructions heretofore tried, those portions of the molded head relied on to grip the metal top plate have been readily fractured and broken off and the fastener device rendered useless or unsightly. It is my aim, therefore, to produce an improved fastening device of this class in which the molded heads are strong and durable; and to this end, having in view the special conditions and modes of treatment required in connection with these plastic covering compounds, I have made the invention herein described. The top plate $A''$ is, in accordance with my invention, formed with a series of marginal teeth, projections, or elevations $a$, and with a series of intermediate marginal depressions $a'$, the depressions $a'$ supporting the head on the supporting-die when the facing-die is operated, as will be understood by all skilled in the art without more particular description.

$A''$ is the top plate, in this instance, of the hook-body, and is provided with a series of teeth, projections, or elevations $a$, formed integral with the plate $A''$, and around and between said teeth, projections, or elevations the head B is compressed in a plastic state, as shown in Fig. 1, so that said head is firmly united to the hook in a durable and substantial manner, the covering B covering and concealing the edge of the top plate and being anchored firmly in place.

The covering B is forced into the edge recesses $a^2$ and is, in the finished article, solidified therein between the walls $a^3$, $a^3$, and $a^4$. The recesses $a^2$ are reëntrant peripheral chambers and may be varied in number as desired. Between these recesses or peripheral chambers $a^2$ are marginal depressions $a'$. The elevations $a$ form the tops of the peripheral and reëntrant chambers, into which the plastic covering is forced inward by the homing-die, whereby a strong firm grip of the covering material is obtained around the periphery of the head. The inwardly-extending chamber-filling portions of the plastic head give strength to the covering at and around the periphery and margin of the metal head and minimize the liability of the covering to fracture at the periphery and margin. The outer ends of the elevations are in a plane at one side of the plane of the head, being usually above the depressions.

It will be seen that by my invention, which I regard as a pioneer improvement in the art, there are provided, at the edge of the plate, interlocking devices between the stud and covering material, such covering being at the same time so strengthened at the periphery by the portions of plastic material entering the recesses under the projecting tongues or elevations and between the walls $a^3 a^3 a^4$ that liability of fracture at the marginal edge is minimized and increased durability given the commercial product.

I do not herein claim the combination, with a tubular eyelet having an upwardly and outwardly extending flange, and having at the junction of the flange and eyelet-body a die-engaging portion, of a hard flange-covering which has beneath the flange a stock-engaging surface that projects beyond the periphery of the flange and is flat at its outer margin, and is at right angles to the lengthwise axis of the tubular eyelet-body, said flange-covering extending from said flat surface upwardly over the edge of the flange and thence inwardly over the outer face of the flange and downwardly toward the tubular opening of the eyelet, as such a construction is claimed by me in my pending application, Serial No. 574,036, filed January 2, 1896, now involved in an interference.

What I claim is—

1. The eyelet or stud having a metal head, with marginal elevations alternating with intermediate marginal depressions, and a plastic cover extending over said metallic head and outside the periphery thereof, and filling the recesses under the elevated portions of the metal, substantially as described.

2. The eyelet or stud having a metallic head with alternating marginal depressions and marginal elevations raised peripherally on the head, above the intermediate marginal depressions, and a plastic cover extending over said metallic head, and under the marginal elevations thereof, to the periphery of the head and the bottom surface thereof; the marginal depressions between the marginal elevations forming part of the bottom of the head and being separated by portions of the covering that project at the periphery of the head underneath the elevations, substantially as described.

3. The eyelet or stud having a metallic head with alternating marginal depressions and peripheral, reëntrant chambers, the tops of which are in a plane different from the plane of the depressions, and a plastic cover extending over said metallic head, including said depressions, and into said peripheral, reëntrant chambers to the bottom thereof, the marginal depressions and the inwardly-projecting portions of the head forming parts of the bottom of the head, substantially as described.

In testimony whereof I have signed my name to this specification, in the presence of two subscribing witnesses, on this 13th day of June, A. D. 1893.

CHARLES E. VAN NORMAN.

Witnesses:
ALBAN ANDRÉN,
ALICE A. PERKINS.